United States Patent [19]
Imai et al.

[11] Patent Number: 5,159,692
[45] Date of Patent: Oct. 27, 1992

[54] IMAGE FILE SYSTEM WITH MULTIPLE CONTROL IMAGE TRANSFER BETWEEN FIRST AND SECOND FILING SYSTEM STORAGE

[75] Inventors: Ryoichi Imai, Tokyo; Kanou Tanaka, Yokohama; Yoshio Ando, Chigasaki, all of Japan

[73] Assignee: Canon Kabushiki Kaisha, Tokyo, Japan

[21] Appl. No.: 873,716

[22] Filed: Apr. 22, 1992

Related U.S. Application Data

[63] Continuation of Ser. No. 711,422, Jun. 5, 1991, abandoned, which is a continuation of Ser. No. 304,906, Feb. 2, 1989, abandoned, which is a continuation of Ser. No. 878,206, Jun. 25, 1986, abandoned.

[30] Foreign Application Priority Data

| Jul. 1, 1985 | [JP] | Japan | 60-144216 |
| Jul. 1, 1985 | [JP] | Japan | 60-144217 |
| Jul. 1, 1985 | [JP] | Japan | 60-144227 |
| Mar. 19, 1986 | [JP] | Japan | 61-61488 |
| Mar. 19, 1986 | [JP] | Japan | 61-61489 |

[51] Int. Cl.⁵ ............................................. G06F 13/00
[52] U.S. Cl. .................................... 395/800; 395/100; 364/DIG. 2; 364/920.7; 364/249.4
[58] Field of Search ............... 364/DIG. 1 MS File, 364/DIG. 2 MS File, ; 360/15, 32, 72.2, 33.1; 358/102, 183, 903, 244, 244.2, 300, 335, 342; 379/40; 340/711, 721, 745; 369/48, 49, 50, 30, 32, 124, 125, 100; 355/64, 53; 395/100, 144, 425, 600, 800

[56] References Cited

U.S. PATENT DOCUMENTS

| 4,053,752 | 10/1977 | DeJohn et al. | 364/200 |
| 4,268,159 | 5/1981 | Tashiro | 346/160 |
| 4,410,917 | 10/1983 | Newdoll et al. | 360/15 |
| 4,417,282 | 11/1983 | Yamamoto | 358/296 |
| 4,437,127 | 3/1984 | Hirose | 358/296 |
| 4,439,790 | 3/1984 | Yoshida | 358/296 |
| 4,485,411 | 11/1984 | Yamamoto | 358/301 |
| 4,485,454 | 11/1984 | Kimoto | 364/900 |
| 4,490,747 | 12/1984 | Yokoyama | 358/296 |
| 4,491,874 | 1/1985 | Yamamoto | 358/296 |
| 4,498,107 | 2/1985 | Yoshimaru et al. | 358/256 |
| 4,500,926 | 2/1985 | Yoshimaru | 358/256 |
| 4,506,342 | 3/1985 | Yamamoto | 358/903 |
| 4,573,084 | 2/1986 | Iida | 358/300 |
| 4,636,848 | 1/1987 | Yamamoto | 358/102 |
| 4,658,299 | 4/1987 | Tanaka et al. | 358/256 |
| 4,760,458 | 7/1988 | Watanabe et al. | 358/256 |
| 4,769,852 | 9/1988 | Hashimoto et al. | 382/45 |
| 4,786,980 | 11/1988 | Sonobe et al. | 358/335 |
| 4,814,893 | 3/1989 | Katoh | 358/296 |

Primary Examiner—Thomas C. Lee
Assistant Examiner—Robert B. Harrell
Attorney, Agent, or Firm—Fitzpatrick, Cella, Harper & Scinto

[57] ABSTRACT

An electronic image filing system includes a reader for reading desired information from a first storage medium containing a plurality of information, a storing device for storing the image read by the reader into a second storage medium, and a controller for controlling the store operation of the storing device. The image on the first storage medium can be retrieved by either the controller or the reader. Following information can be retrieved before the information read by the reader has been stored into the second storage medium.

16 Claims, 9 Drawing Sheets

IMAGE FILE SYSTEM WITH MULTIPLE CONTROL IMAGE TRANSFER BETWEEN FIRST AND SECOND FILING SYSTEM STORAGE

This application is a continuation of application Ser. No. 07/711,422 filed Jun. 5,1991 now abandoned which is a continuation of application Ser. No. 07/304,906 filed Feb. 2, 1989 which was abandoned, which is a continuation of application Ser. No. 06/878,206 filed Jun. 25, 1986 which was abandoned.

BACKGROUND OF THE INVENTION

1. Field of the Invention

The present invention relates to a controller for an electronic file system.

2. Related Background Art

A microfilm system has been used as an information storage system which manages a large volume of information for later utilization. A microfilm system is superior in economy, retainability and resolution power. It also has a high input speed and can rapidly copy a large volume of information. Further, it is suitable to efficiently store and manage file information which increases year by year.

On the other hand, office automation has been recently introduced rapidly. There has been a trend to introduce computers into office equipment and also to couple the equipment through communication lines. To comply with such trend of computerization and coupling through the communication lines, it is desirable that the information to be processed is stored in a form of an electrical signal. Thus, an electronic file system has been recently noticed. The electronic file system stores the information in the form of electrical signals and has characteristics of high speed retrieval and high speed transmission which are not found in the microfilm system.

The electronic system has the above characteristics and is well adapted to the recent trend of office automation but the microfilm system, is not well adapted to such a trend. It has a significant problem in that it is not compatible with computerized and communication linked office equipment.

However, the electronic file system has defects which eliminate some of the advantages of the microfilm system. It cannot convert the input information in a one-shot process as the microfilm system can do through a lens system but the information must be serially raster-scanned. As a result, an input speed is slow. An operator cannot check the input image without a special display. Large numbers of copies cannot be rapidly and ,economically produced. Long-term storage of information is not assured as compared to the microfilm system which assures the long-term storage of one hundred years. The electronic file is not accepted as a legal evidence as opposed to the microfilm.

A further problem is that when the electronic film system is introduced, the data base and information structured by using the microfilm system can no longer be utilized. As described above, the microfilm system and the electronic file system have their own advantages. From the standpoint of the recent trend of the office automation, the electronic file system has many advantageous features but it is apparent that the microfilm system cannot be ignored. Accordingly, an information storage system which utilizes the information stored in the microfilm and the advantage of the high retrieval speed of the electronic file system and which is adapted to a consolidated information management system having features of efficient retrieval, updating, editing and storing of information has been desired.

An electronic file system which photo-electrically reads an image of a microfilm, converts it to an electrical signal and stores it on an optical disk has been developed. However, in order to retrieve a desired image on the microfilm and record it on the optical disk, a complex control is required. If it is controlled by a host computer, the burden to the host computer is large and processing speed decreases.

Figure 1A:
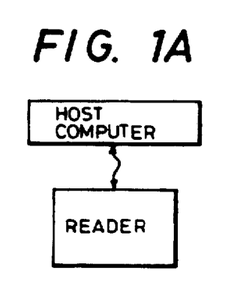
FIGS. 1A and 1B show prior art microfilm readers.
Figure 1B:
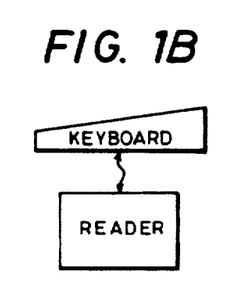

FIGS. 1A and 1B show systems which computer-control an equipment such as a film reader. In such systems, only the keyboard for controlling the equipment or the host computer can access the film reader. Accordingly, when the host computer controls other units than the film reader, the film reader cannot retrieve a desired film frame and freedom of operability is restricted.

SUMMARY OF THE INVENTION

It is an object of the present invention to remove the drawbacks as above-mentioned.

It is another object of the present invention to provide a controller for an electronic file system which eliminates the above defects.

It is another object of the present invention to provide a system which stores image data of a read-only file into another file.

It is still anther object of the present invention to provide a controller which allows control of an image processing terminal either from a keyboard or from a host computer.

It is a further object of the present invention to provide an electronic file system which reduces the control burden, by a host computer and prevents a reduction in processing speed.

It is yet another object of the present invention to provide an electronic file system which improves operability for image retrieval and recording.

It is still a further object of the present invention to provide an image file system which can readily recover an error produced when an image recorded on a recording medium is read and converted to an electrical signal.

It is an additional object of the present invention to provide an electronic file system which instructs a condition to read an image, from a host computer.

BRIEF DESCRIPTION OF THE INVENTION

DESCRIPTION OF THE PREFERRED EMBODIMENTS

Figure 2:
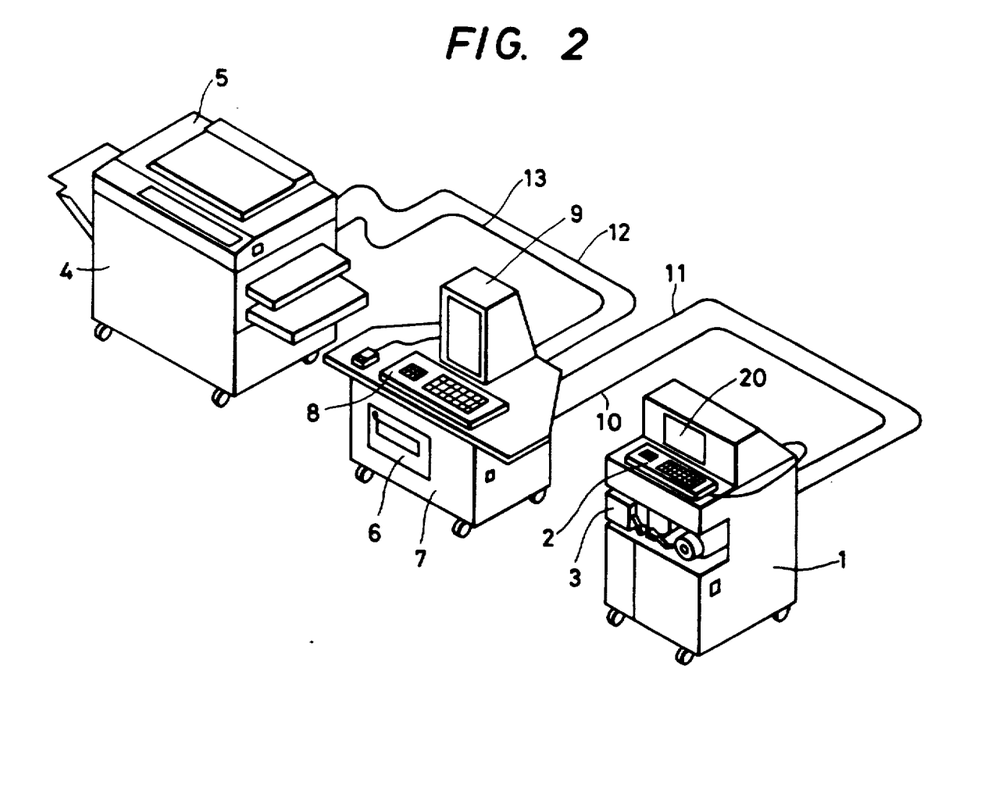
FIG. 2 shows an external view of an electronic file system.

FIG. 2 shows an external view of an image processing system comprising a microfilm reader and an electronic file, to which the present invention is applied. Numeral 1 denotes a microfilm scanner (reader) which reads an image on a microfilm by a CCD and converts it to an electrical signal. Numeral 2 denotes a keyboard which is used to retrieve a desired frame of a microfilm, instruct a printout and indicate an error. Numeral 3 denotes a retriever for retrieving a desired frame of an image recorded on a 16 mm roll film. Numeral 4 denotes a laser beam printer. Numeral 20 denotes a screen on which the desired frame is optically projected. Numeral 5 denotes a document scanner which reads a document image and converts it to an electrical signal. Numeral 6 denotes an optical disk unit for recording the image information on an optical disk. Numeral 7 denotes a host computer for controlling the overall system. Numeral 8 denotes a ,keyboard for supplying commands to the host computer 7. Numeral 9 denotes a CRT display which displays the image and operation information. Numeral 10 denotes a signal line which transmits a command from the, controller to the electronic microfilm scanner. Numeral 11 denotes a signal line for transmitting the electrical microfilm image signal to the host computer 7, and numerals 12 and 13 denote signal lines which transfer data between the scanner 5 and the printer 4, respectively, and the host computer 7.

The image signal read by the microfilm reader 1 is transmitted to the printer 5 through the signal lines 11 and 12 and the image is recorded on a record sheet. The image signal from the microfilm reader 1 is also transmitted to the image file 6 through the signal line 10 and stored in the optical disk. The image signal retrieved and read from the image file 6 is transmitted to the printer 5 through the signal line 13 and the image is recorded.

Figure 3:
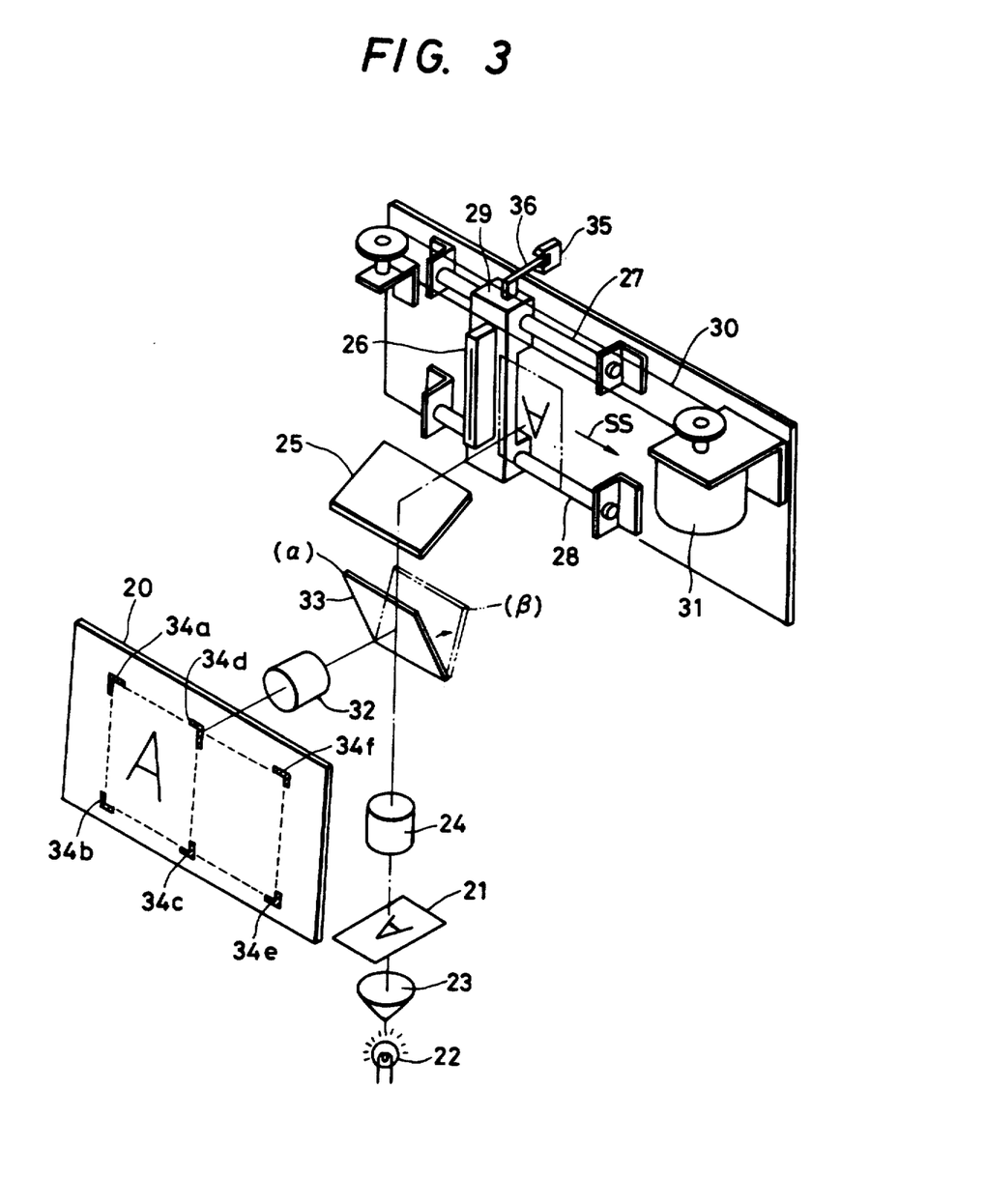
FIG. 3 shows a construction of a microfilm reader.

FIG. 3 shows a construction of one embodiment of the microfilm reader 1.

A film frame 21, which bears desired image information, is illuminated by a halogen lamp 22 and a condenser lens 23. A projected image is focused onto a scan plane of an image sensor (e.g. CCD) arranged in a line along a main scan direction, through a focusing lens 24 and a fixed mirror 25. The image sensor 26 is fixedly mounted on a carriage 29 which is movable along guides 27 and 28. It is moved in a sub-scan direction SS when a wire 30 spanned across the carriage 29 is driven by a motor 31. In this manner, the image sensor 26 scans and reads the image information.

A photo-interruptor 35 is fixed on the image reader to generate a timing signal to start a read scan in synchronism with interruption of an output light from the photo-interruptor 35 by a douser 36 fixed to the carriage 29.

A switchable mirror 33, which can be switched between two stable positions α and β, is arranged between the focusing lens 24 and the mirror 25. By switching the mirror 33, the image of the film frame 21 is enlarged and focused onto a screen 20 through a projection lens 32.

Figure 4:
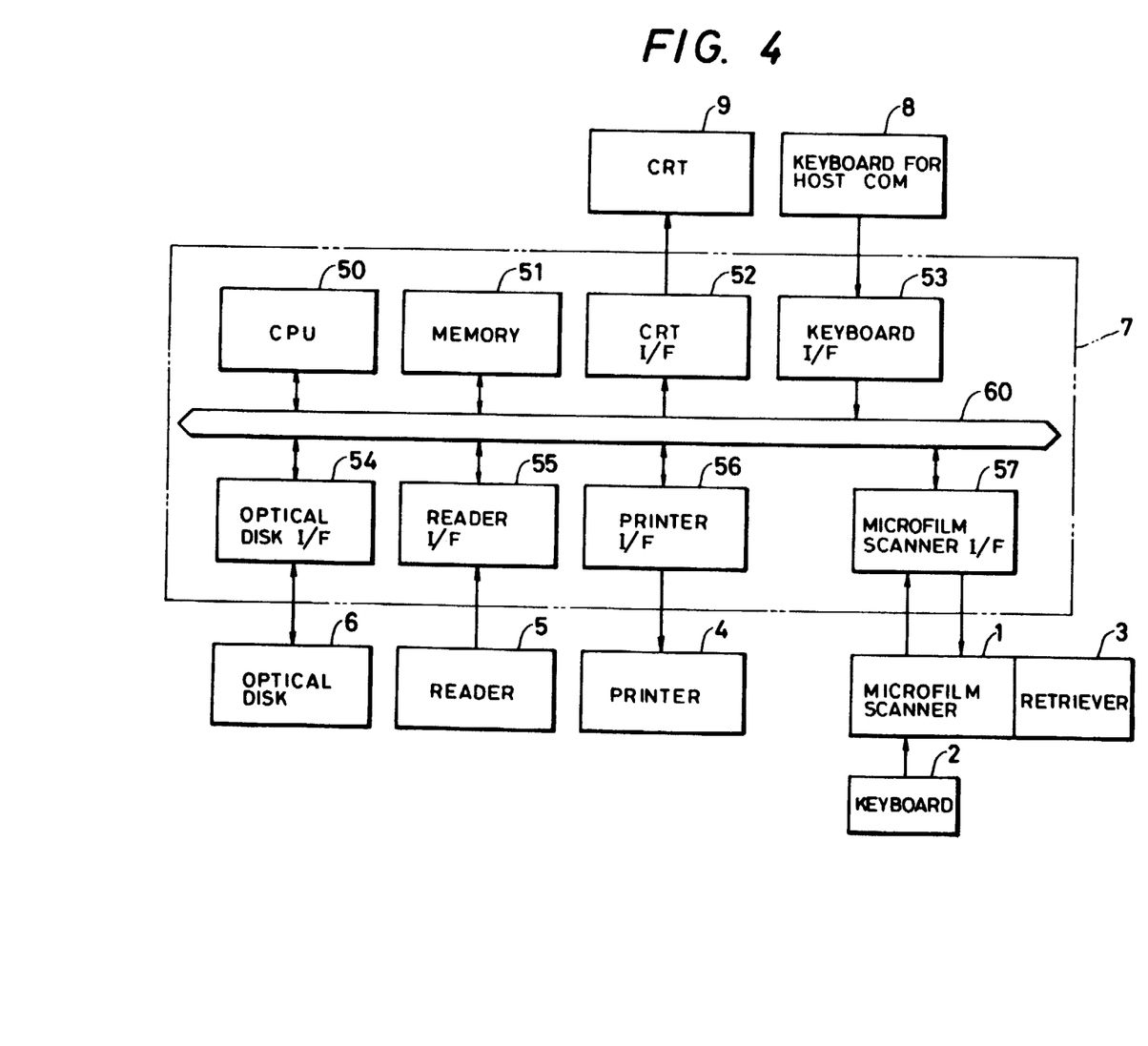
FIG. 4 is a block diagram of a controller of an electronic file system.

FIG. 4 shows a control block diagram of the electronic file system of FIG. 2. The like elements to those shown in FIG. 2 are designated by the like numerals. Numeral 50 denotes a CPU which may be Motorola microcomputer 68000. Numeral 51 denotes a memory which temporarily stores image data and is used as a work area CPU 50. Numeral 52 denotes an interface for supplying data to the CRT 9 which displays images read by the microfilm scanner and the document scanner, and operation information. Numeral 53 denotes an interface for receiving data from the keyboard 8 and numeral 54 denotes an interface for transferring data to and from the optical disk unit 6. Numeral 55 denotes an interface for transferring data to and from the reader and numeral 56 denotes an interface for transferring data to and from the printer. Numeral 57 denotes an interface which transfers data to and from the microfilm scanner 1 and has a serial-to-parallel conversion function to convert the serial image data sent from the microfilm scanner 1 to a 16-bit parallel data. Numeral and numeral 60 denotes a 16-bit width bus through which the image data and the control signals are transferred.

Figure 5:
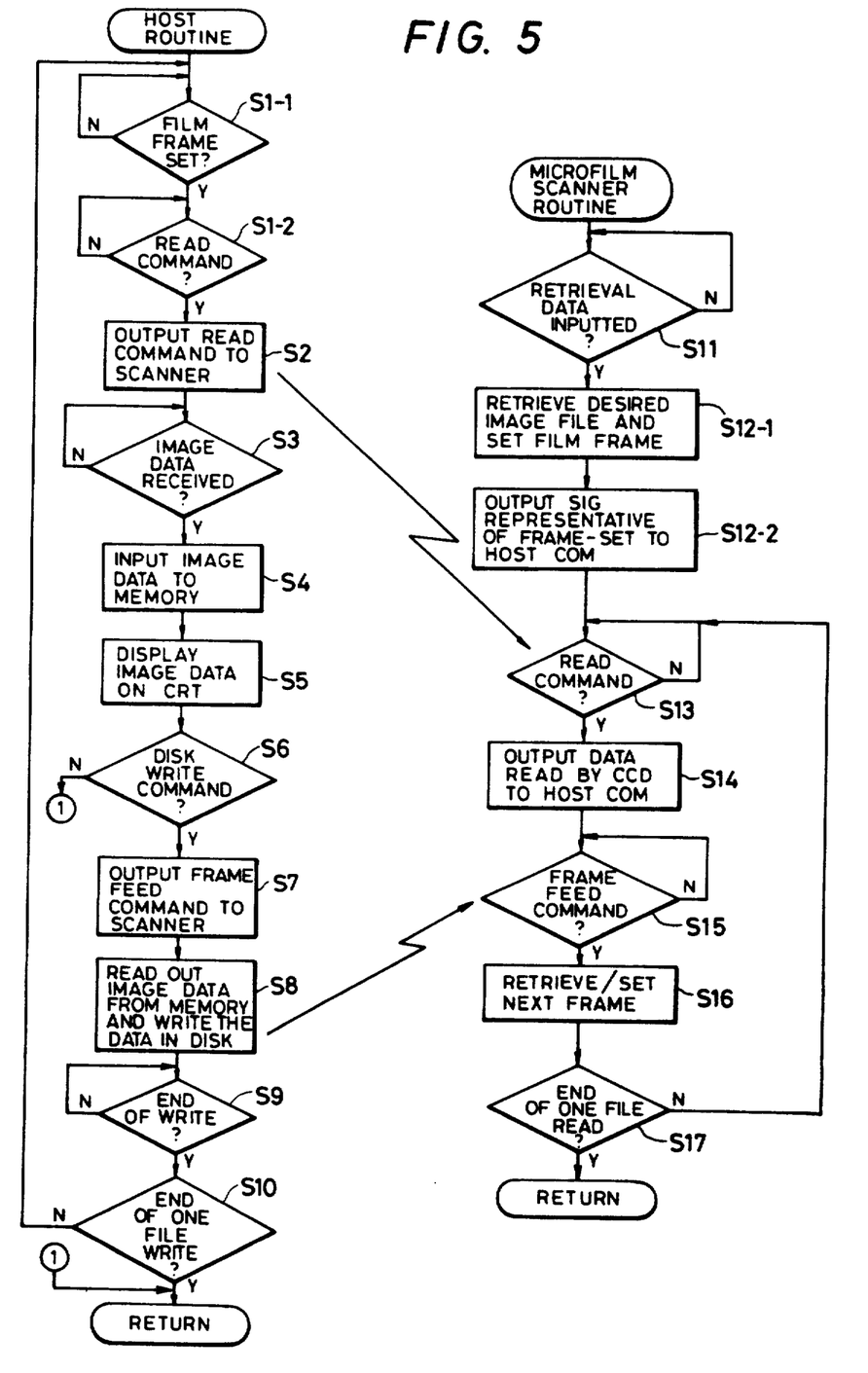
FIGS. 5 and 6A and 6B show flow charts for the microfilm reader and a host computer.

FIG. 5 shows a control flow when the image file read by the microfilm scanner is recorded onto the optical disk.

A host routine of this flow chart is stored in a program memory in the CPU 50 and executed by the CPU. A microfilm scanner routine is stored in a program memory in the microfilm scanner and executed by the CPU in the scanner.

An operator first enters retrieval information for a desired film file (or film frame) through the keyboard 2 of the microfilm scanner (step 11). The film is fed in accordance with the input retrieval information, the desired file (aggregation of frames) is retrieved and the leading frame is positioned to a read position (step 12-1). A signal indicating that the desired film frame of the file has been set is sent to the host (step 12-2). The desired frame is projected on the screen 20. The microfilm scanner 1 waits for a read signal supplied from the host through the interface 57 (step 13). The host 7 waits until it receives the signal indicating that the film frame has been set (step 1-1). When it receives the signal, it waits for a command from the keyboard 8 to read in the image data from the microfilm scanner 1 (step 1-2), and when it receives the command, it sends the read signal to the microfilm scanner 1 (step 2). When the microfilm scanner 1 receives the read signal, it scans the film frame image by the CCD to convert it to an electrical signal and sends it to the host (step 14). The host stores the transmitted image data into the memory 51 (steps 3, 4) and causes the CRT 9 to display the image data (step 5). The operator may check the displayed image before he/she enters a command to store it into the disk. When the command to store into the disk is issued through the host keyboard 8 (step 6), a frame feed command is issued to the microfilm scanner 1 to read the image of the next frame (step 7). The image data is read from the memory 51 and written into the optical disk (step 8). When the microfilm scanner 1 receives the frame feed signal from the host, it feeds the film to retrieve the next frame and set it to the read position (steps 15 and 16). This process is repeated until one file has been read (step 17). The film feed to retrieve the next frame is carried out in parallel with the recording of the image of the previous frame into the optical disk by the host. Thus, the repetition of retrieval and storage can be cycled rapidly.

After the image of one frame has been recorded in the disk, whether all frames of one image file have been recorded or not is checked (steps 9, 10), and if all frames have not been recorded, the process returns to the step 1.

In the present embodiment, since the image read from the microfilm can be displayed on the CRT, the operator may check the image before he/she stores it in the disk.

In the present embodiment, the operator enters the command through the keyboard 8 to record one frame, although this may be automatically carried out. In this case, the decision in the step 6 is unconditionally YES. Thus, in response to the end of storing the image into the memory 51, it is automatically transferred to the disk.

In the present embodiment, when the recording of one film file into the disk has been completed, the operator selects the new desired file, although a plurality of files may be sequentially recorded in the disk.

In the present embodiment, since the frame image of the microfilm is stored in the memory 51, if an error occurs during the recording onto the disk 6, the frame image may be read out again and rerecorded.

Retrieval information for a new file or frame image may be entered from the keyboard 2 of the scanner 1 during the recording of the previous frame onto the optical disk 6 to cause the desired film image to stand by the read position and the reading of the new film frame is started in response to the completion of the storing into the disk. Thus, a time to store the image into the disk 6 can be reduced. When the record command for the image information to the disk 6 is issued from the host keyboard 8, the new image file can be entered from the keyboard 2 before the storing of the previous image information into the disk 6 is completed. To this end, if the record command is issued to the disk 6 (step 6), the signal may be sent from the host 2 to the microfilm scanner 1 to permit key entry of the retrieval information by the keyboard 2.

Another embodiment of the present invention is now explained.

Figure 6A:
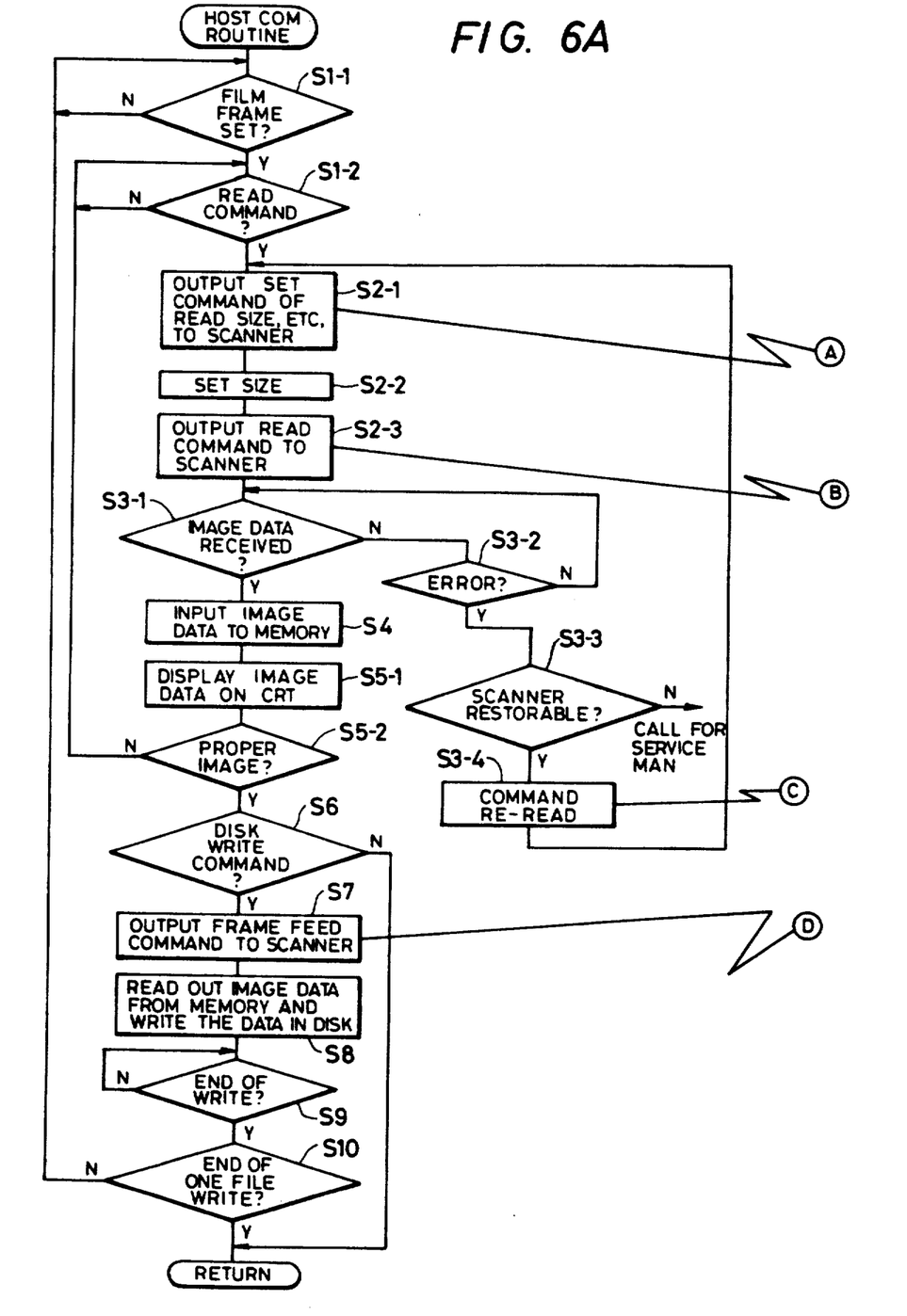
Figure 6B:
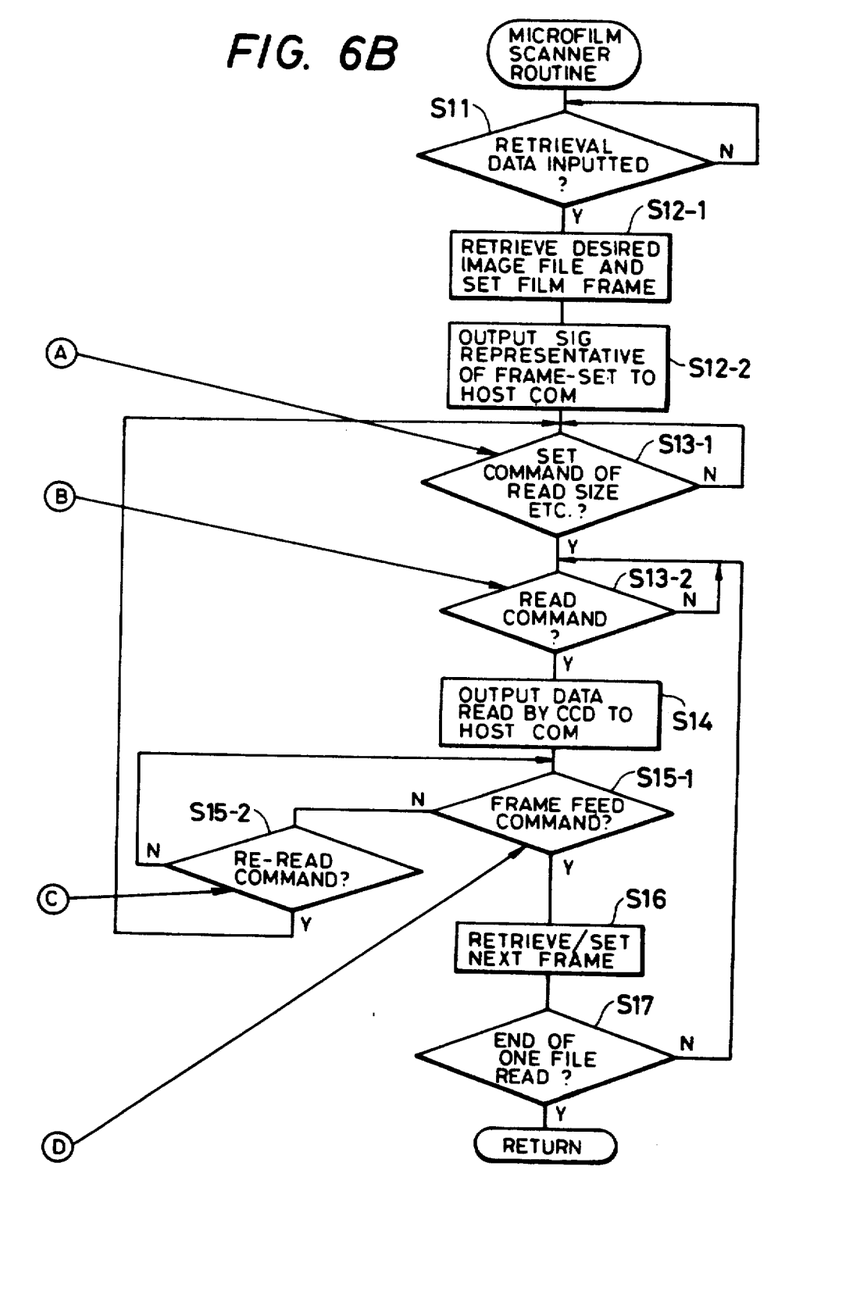

In the above electronic file system, if an error occurs when the image of the microfilm is read and converted to the electrical signal, it is difficult in many cases to recover the error. An error process is explained with reference to FIG. 6.

The operator first enters retrieval information for a desired file (or frame) through the microfilm scanner keyboard 2 (S11). The film is fed in accordance with the input retrieval information and stopped at the read position (S12-1). A signal indicating that a desired film frame has been set is sent to the host computer 7 (S12-2). The desired frame image is projected on the screen 20.

The microfilm scanner waits for setting signals for microfilm read size, density and magnification from the host computer 7 (S13-1). The host computer 7 stands by until the signal indicating that the film frame has been set is supplied (S1-1). When it receives this signal, it waits for the command from the keyboard 8. That is, it waits for the image data read command from the microfilm scanner 1 (S1-2).

When the host computer 7 receives the command, it sends the signals for size, resolution, density and magnification to the microfilm scanner 1 (S2-1). The host computer 7 sends the scan range, that is, the number of sub-scan lines and the number of dots per main scan line to a control circuit in the host computer 7 in accordance with the microfilm read size and the resolution of the CCD of the microfilm scanner (S2-2). When a plurality of types of images of predetermined sizes are to be stored in storage means, the reading and storing of the image area controlled in accordance with type data (including the number of sub-scan lines and the number of dots per main scan line) which indicate the category of the images in which the designated condition falls.

The host computer 7 sends the read signal to the microfilm scanner 1 (S2-3).

On the other hand, the microfilm scanner 1 sets the size, density and magnification (S13-1), converts the frame image to an electrical signal by the CCD in accordance with the read size, resolution and magnification set in the step S13-1, and sends it to the host computer 7 (S14).

For example, if the image size which can be stored in the optical disk is a half-size (210 mm×279 mm) and the frame image of the microfilm is of full size (279 mm×420 mm), the frame image is read at such resolution and magnification that the full size image is reduced to the half size image. The read condition is designated by the host.

The host computer 7 receives the image data (S3-1) and stores the image data into the memory 51 in accordance with the number of lines and the number of dots set in the host computer 7 (S4), and displays the input image data on the CRT 9 (S5-1).

If one frame of image data is not sent from the microfilm scanner 1, whether an error has occurred or not is checked (S3-2). If the image data is insufficient at the end of the CCD scan, it is considered that the error has occurred, and whether the error can be recovered by the microfilm scanner 1 or not is checked (S3-3). That is, whether the microfilm scanner 1 can reread the image or not is checked, and if it can, the request to reread is displayed and a reread signal is sent to the microfilm scanner 1 (S3-4). If the microfilm scanner cannot reread the image, a serviceman call signal is issued. The same is true when a transmission line for the read data is in error.

In this manner, if the error occurs when the selected one of a plurality of frame images recorded on the microfilm is read and converted to the electrical signal, the frame related to the error is reread to recover the error.

The input image data is displayed on the CRT 9 (S5-1), the operator checks the image on the CRT 9 (S5-2), and if the image density is not proper or if the read magnification is to be changed, the microfilm scanner waits for the read signal (S1-2).

If the disk store signal is supplied from the keyboard 8 (S7), the frame feed signal is sent to the microfilm scanner 1 (S7), the image data is read from the memory 51 and it is stored into the optical disk 6 (S8).

When the microfilm scanner 1 receives the frame feed signal from the host computer 7, it feeds the next film, retrieves the next frame and sets it to the read position (S15-1, 16). If the reread instruction is issued (S15-2), the process returns to the step S13-1. This process is repeated until one file has been read (S17).

The film feed to retrieve the next frame and the recording of the image of the previous frame into the optical disk are carried out in parallel in the host computer 7.

When recording of one frame has been completed, whether recording of entire image file has been completed or not is checked (S9, 10), and if it has not been, the process returns to the step S1-1.

Since the read resolution and magnitude usually need not be changed during one block of jobs, the instructions may be issued once at the first time and only the read size may be subsequently designated.

When the read size is to be designated, the operator watches the monitor screen 20 of the microscanner 1 and checks if the image frame to be read is of half size (e.g. size A4) or full size (e.g. size A3). The read size is sent to the host computer 7 through the keyboard 2 of the microfilm scanner 1. The host computer 7 may set the number of dots per main scan line and the number of sub-scan lines in internal counters in accordance with the read size signal.

Figure 7:
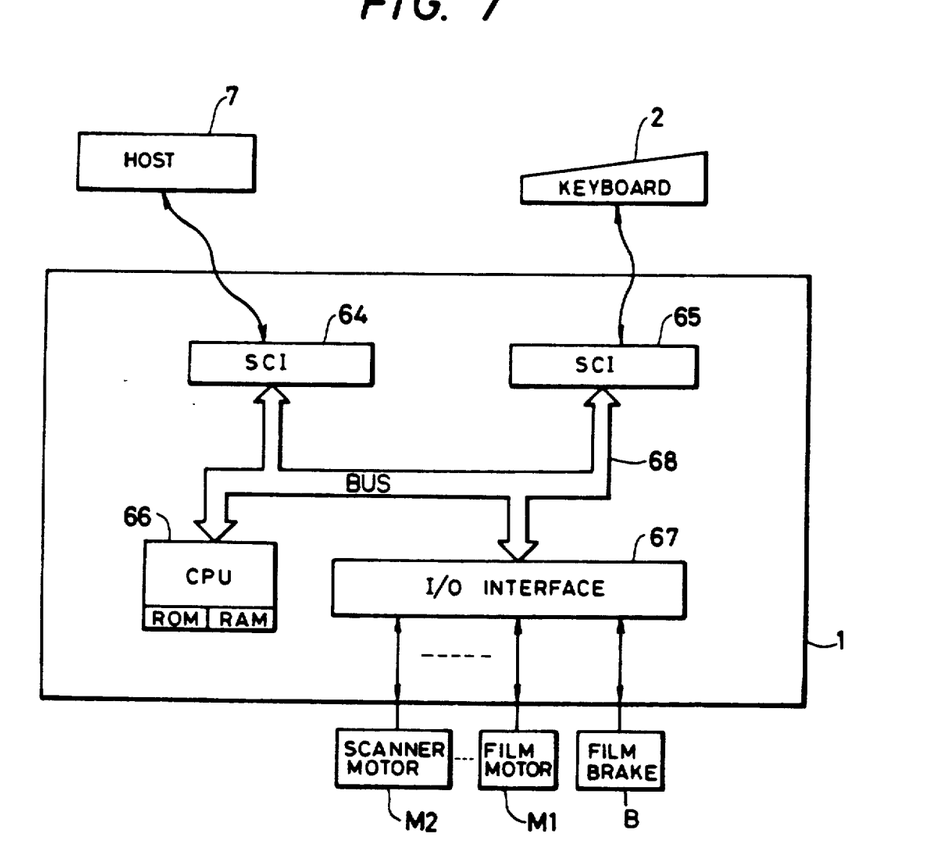
FIG. 7 is a system block diagram of the microfilm reader and the host computer.

FIG. 7 shows a system block diagram of the interface between the reader and the host computer. The reader comprises a reader terminal which read a microfilm bearing a plurality of frames of images by a linear CCD and an electronic file terminal for sequentially storing the images read by the reader into the optical file. The file host computer 7 and the microfilm reader (hereinafter called reader) 1 are connected by a communication lines through an interface SCI and an interface RS-232C. The keyboard 2 which enters data for the microfilm retrieval and read is connected to the reader 1 by a communication line through RS-232C. The communication line from the host computer 7 is connected to a serial communication interface (SCI) 64, and the data from the host and the data from the reader are interacted by protocol. The communication line from the keyboard 2 is connected to a serial communication interface (SCI) 65. A CPU 66 controls the film frame retrieval (including one frame feed) and the frame read in the microfilm reader 1. Numeral 67 denotes an I/O interface which conveys the instructions from the CPU 66 to external control circuits such as a frame feed motor M1 of the reader 1 and a CCD drive motor. Numeral 68 denotes a data bus through which data are transferred between the interfaces 64, 65 and 67 and the CPU 66.

Figure 8:
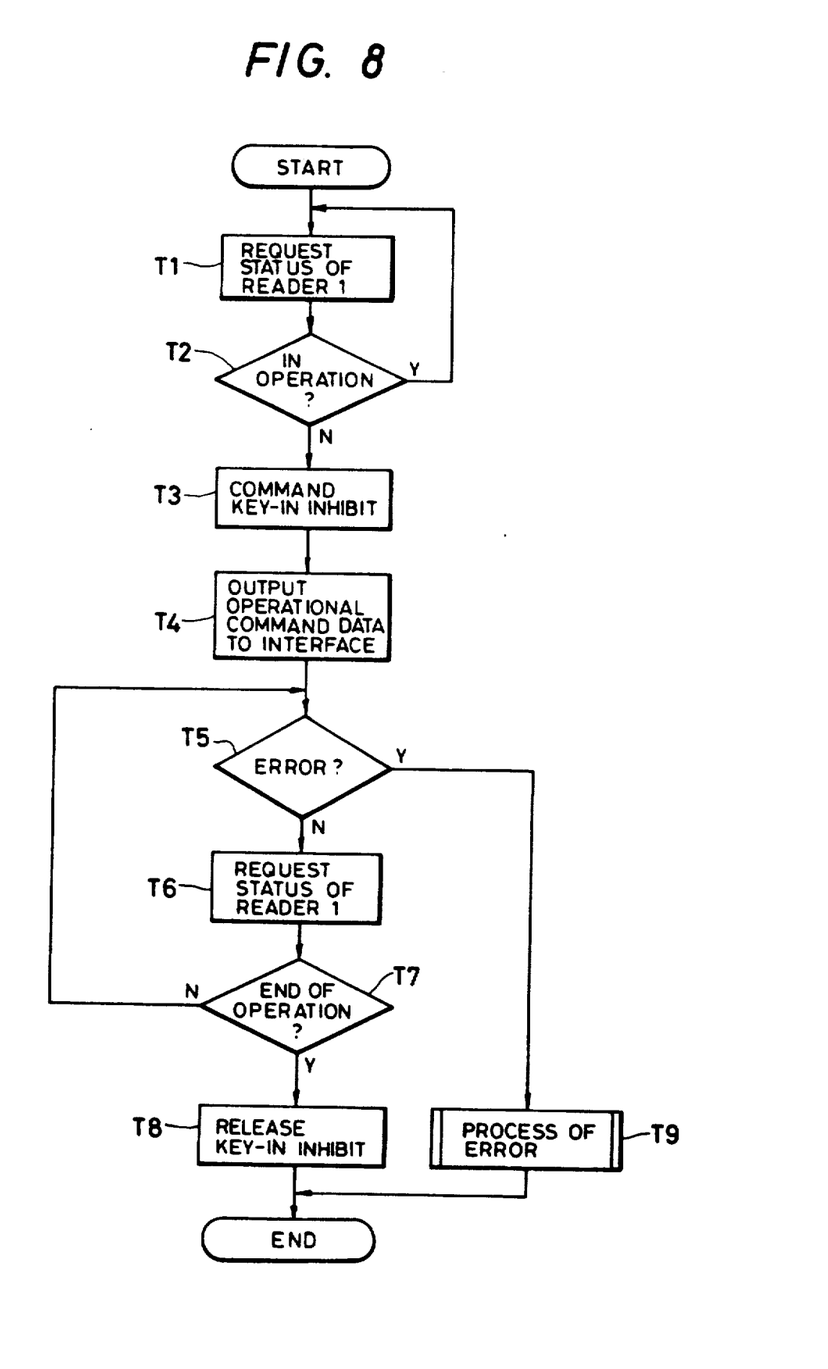
FIG. 8 shows a control flow chart in the host computer connected to the microfilm reader.

FIG. 8 shows a flow chart programmed in a CPU and a ROM of the host 7 for instructing film frame retrieval and read to the reader 1 from the host 7. In a step T1, a request for a status signal which indicates whether the microfilm reader 1 is standing by, retrieving the frame or reading the film is sent to the reader 1. If the status signal from the reader 1 indicates the frame retrieval or film read, the status request to the reader 1 is repeated until the retrieval or read is completed (T2). If the reader 1 is in the stand-by state, a keyboard input inhibit command is sent to the interface (SCI) 64 in T3. A flag is set in the RAM of the reader 1 to inhibit the key input to the reader 1 so that the key inputs from the keyboard 3 such as retrieval or read signal are not accepted. In T4, the host 7 sends the retrieval data and the read signal to the interface 64 to render the reader 1 carry out the operation in accordance with the instruction from the host 7.

As the reader 1 starts the retrieval and read operations, the host determines in T5 whether an error such as film jam has occurred or not in the reader 1. This is done by sensing the serial data sent from the reader 1. If the host 7 detects the error data, it sets an error flag in T9 and clears the film data supplied from the reader 3 and stored in the buffer memory of the host before the error occurred and stands by in a store state. If no error is detected, the status signal is requested by the reader in T6, and whether the retrieval of the reader 1 has been completed or not is checked in accordance with the status signal. If and if it has not been completed, the steps T5 to T7 are repeated until it has been completed The input from the keyboard 3 is inhibited during this period. As the serial data from the reader 1 is sensed and the end of retrieval is detected, a keyboard input inhibit release instruction is sent to the interface (SCI) 65 of the reader 1 in T8 to release the key input inhibit to the reader 1 and to allow input of the retrieval data from the keyboard In T3, the input inhibit command may be issued in response to the stand-by status of the reader 1 or it may be issued through the keyboard of the host 7.

Figure 9:
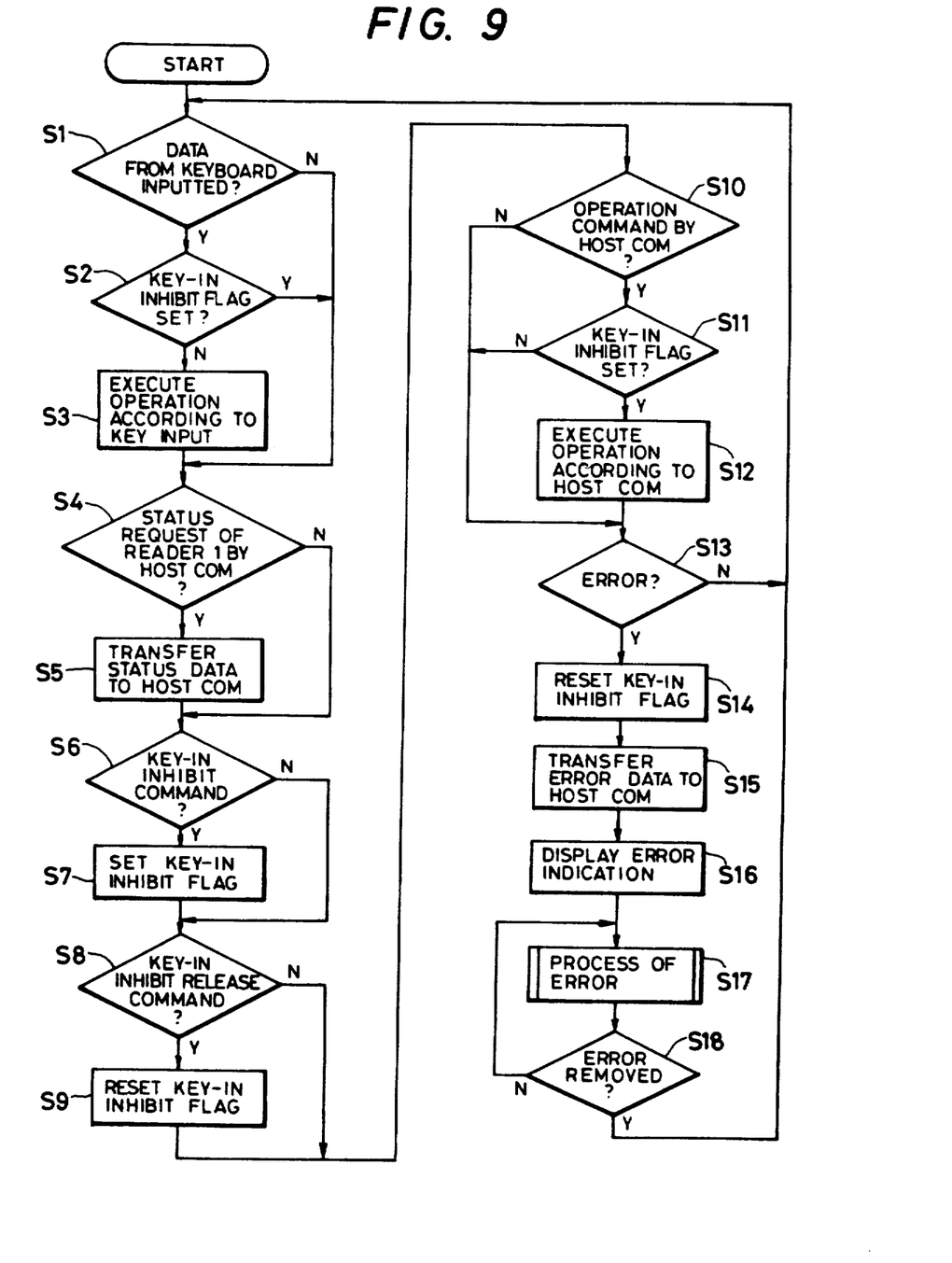
FIG. 9 shows a control flow chart in the microfilm reader.

FIG. 9 shows a flow chart of system control and processing in the CPU 66 of the reader 1. It is executed by the CPU 66, a ROM which contains the program and a RAM which stores flags. In S1, whether the retrieval data from the keyboard 2 and the key input such as read start exist or not in the interface 5 is checked. If there is a key input, whether the key input is inhibited or not is checked by examining the flag in the RAM (S2). If the key input is not inhibited, the frame retrieval data from the keyboard is stored in the memory RAM (S3). In S3, the frame drive motor Ml is energized in accordance with the retrieval data to position a desired frame to a read position In S4, whether the status request has been issued from the file host computer 7 to the microfilm reader 1 is checked, and if the status request has been issued, the status data of the reader 1 such as read operation or stand-by is sent to the host computer 7 through the SCI (S5). In S6, whether the key input inhibit instruction has been issued from the file host computer 7 or not is checked. If it has been issued, the key input inhibit flag in the RAM is set in S7 to set the key input inhibit status and the key input inhibit is displayed on the display. In S8, whether the file host computer has issued the key input inhibit release instruction or not is checked. If it has been issued, the flag already set is reset to release the key input inhibit status is turned off. The display of the key input inhibit S10, if the host computer instructs the operation such as frame retrieval to the reader, whether the key input inhibit status exists or not is checked (S11). If it exists, the data such as frame retrieval from the file host computer 7 is stored in the RAM and the retrieval is instructed (S12).

In S13, whether the error such as film jam has occurred or not during the frame movement to retrieve the frame in the reader 1 is checked. If the error has occurred, the key input inhibit state is released, the display of the keyboard input inhibit is turned off (S14), the error state is sent to the file host computer 7 (S15), and the error is displayed on the display of the keyboard 2 (S16). If there is no error, the process returns to S1 to S3, the key input from the keyboard is accepted unless the key input is inhibited, and the command to start the frame retrieval or read from the keyboard is allowed.

If there is an error, the error is processed in S17 and the process loops S17 until the error is eliminated by rereading the film (S18). After the error has been eliminated, the process returns to S1 and repeats the above operation. If no error is detected in S13, or after the error has been eliminated, the process proceeds to S1 and S2. When the key input is inhibited, the key entry from the keyboard in S1 is inhibited and the instruction from the host computer 2 such as retrieval instruction is not released. Thus, as the reader enters into the retrieval state by the instruction from the computer, that state is held and a malfunction is prevented.

In this manner, the host computer 7 issues the key input inhibit instruction to the reader 1 before it sends the retrieval data to the reader 1 and holds the instruction to inhibit the key input until the host issues the release instruction or the error is produced. Therefore, the reliability of the operation is improved. If the key input is not inhibited when the data is sent from the host 2 to the reader 1, the data is not stored in the RAM and the retrieval is not carried out. Therefore, the reliability is further improved. Since the key input inhibit is released when an error exists in the reader 1 or the host 7, the film frame may be reset to the initial start position for reading.

The data in S3 and S12 include data which causes the CCD to read the film frame held in the read position. This data is used to scan one frame of film. After the one-frame scan, the scan is stopped and the serial data indicating the stand-by is sent to the host 7 in S5.

The instructions from the host 7 include the one-frame advance instruction and the one-frame exposure, read and scan instruction. The instructions from the keyboard 2 (host keyboard 8) includes the leading frame queuing data, film feed instruction for queuing, film rewinding instruction, read size instruction, read data density change instruction, automatic density set instruction and one-frame advance 1 retard instruction.

In the present embodiment, the frame retrieval of the microfilm reader can be controlled either by the keyboard or by the host computer of the file terminal, and the freedom of operability is improved Since the key input from the keyboard is inhibited while the host computer instructs the operation, the error prevention rate is improved. The system can be monitored by displaying the key input inhibit status The above embodiments are applicable to a system which retrieves image or data file, reads the retrieved image or file and stores it into another file. The file to be read may be an optical card or an optical disk, and the file in which the image or data is to be stored may be a writable disk or card. The storage file disk 76 can be retrieved and the read image can be displayed on the CRT 9 (FIG. 2) or printed out by the printer 4. When a read-only information storage medium is used as the read file, necessary portion of the information stored in the permanent information file (master file) may be transferred to the other information file to facilitate handling.

We claim:

1. An image filing apparatus comprising:
a first image filing system;
a second image filing system; and
a control system for controlling the operations of said first and second filing systems;
said first image filing system including:
(1) input means for inputting, independently of said control system, retrieval data for retrieving an image recorded on a microfilm and a signal for instructing the reading of the image recorded on the microfilm,
(2) retrieval means for retrieving, independently of said control system, an image recorded on the microfilm, in accordance with retrieval data inputted through said input means; and
(3) reading means for reading an image recorded on the microfilm retrieved by said retrieval means;
said second image filing system including storing means for storing an image in a memory medium; and
said control system outputting, independently of the entry of a signal from said input means, a signal for activating said reading means to read an image retrieved by said retrieval means, and outputting a signal for activating said storing means to store in the memory medium the image read by said reading means, when an image on said microfilm is to be stored in the memory medium.

2. An apparatus according to claim 1, wherein said retrieval means outputs an electric signal corresponding to the retrieved image.

3. An apparatus according to claim 1, wherein said control means outputs an instruction signal for retrieving an image next to the image retrieved through said retrieval means.

4. An apparatus according to claim 1, wherein said control means outputs an instruction signal for outputting the retrieved image to said retrieval means.

5. An apparatus according to claim 1, wherein said memory medium is an optical storage medium.

6. An apparatus according to claim 1, wherein said control system includes means for inputting an instruction signal for storing an image in said memory medium.

7. An image filing apparatus comprising:
a first filing system;
a second filing system; and
a control system for controlling operations of said first and second image filing systems;
said first image filing system including:
(1) input means for inputting, independently of said control system, a frame feed instruction signal for retrieving an image recorded on a microfilm and a signal for instructing the reading of the image recorded on the microfilm;
(2) moving means for moving the microfilm, independently of said control system, according to the frame feed instruction signal inputted through said input means, and
(3) reading means for reading an image recorded on the microfilm;
said second image filing system including storing means for storing an image in a memory medium; and
said control system outputting a signal for activating said storing means to store in the memory medium one of plural images read by said reading means, and outputting independently of the entry of a signal from said input means a signal for activating said moving means before the storing of the whole of the read one image in the memory medium so as to allow to reading a succeeding image to be stored, when the plural images on said microfilm are to be stored in the memory medium.

8. An apparatus according to claim 7, wherein said control system outputs the signal for activating the moving means in synchronism with start of storage of the image into the memory medium.

9. An apparatus according to claim 7, wherein said reading means outputs the succeeding image retrieved after completion of image storage in the memory medium.

10. An apparatus according to claim 7, wherein said reading means outputs an electrical signal corresponding to the retrieved image.

11. An apparatus according to claim 7, wherein said input means is capable of inputting a frame feed instruction signal and a signal for instructing the reading of a different image recorded on the microfilm before completion of image storage in the memory medium.

12. An image filing apparatus comprising:
a first image filing system,
a second image filing system; and a control system for controlling apparatus of said first and second image filing systems;

said first image filing system including, (1) input means for inputting, independently of said control system, a frame feed instruction signal for retrieving an image recorded on a microfilm and a signal for instructing reading of an image recorded on the microfilm, (2) moving means for moving the microfilm independently of said control system, based on the frame feed instruction signal inputted through said input means; and (3) reading means for reading an image recorded on the microfilm;

said second image filing system including storing means for storing an image in a memory medium;

said control system outputting independently of the entry of a signal from said input means a signal for activating said reading means, and outputting a signal for activating said moving means, when plural images of said microfilm are to be stored in the memory medium; and said control system further outputting an inhibit command for inhibiting the entry of a signal from said input means prior to the output of the signal for activating said reading means and the signal for activating said moving means.

13. An apparatus according to claim 12 further comprising means for detecting a fault in said reading means, wherein said control system releases inhibition of the reading based on the signal for instructing reading of an image input through said input means when said detecting means detects the fault in said reading means.

14. An apparatus according to claim 12, wherein said control system inhibits said reading means in accordance with an operational state of said reading means.

15. An apparatus according to claim 12, wherein said control system inhibits the reading based on the signal for instructing the reading of an image input through said input means prior to said control system outputting the signal for activating the reading means.

16. An apparatus according to claim 15, wherein said control system releases inhibition of the reading based on the signal for instructing reading of an image input through said input means after transfer of a retrieved image from the reading means into said memory medium.

* * * * *

UNITED STATES PATENT AND TRADEMARK OFFICE
CERTIFICATE OF CORRECTION

PATENT NO. : 5,159,692
DATED : October 27, 1992
INVENTOR(S) : RYOICHI IMAI ET AL.

It is certified that error appears in the above-indentified patent and that said Letters Patent is hereby corrected as shown below:

COLUMN 1

Line 53, "and ," should read --and--.

COLUMN 2

Line 33, "anther" should read --another--.
    Line 39, "burden," should read --burden--.
    Line 51, "image," should read --image--.

COLUMN 3

Line 21, "a," should read --a--.

COLUMN 4

Line 14, "Numeral and" should be deleted.
    Line 15, "numeral 60" should read --Numeral 60--.

COLUMN 7

Line 17, "a" should be deleted.
    Line 65, "If and if" should read --If--.

COLUMN 8

Line 5, "keyboard In" should read --keyboard. In--.
    Line 33, "release" should read --release and--.
    Line 35, "inhibit S10," should read --inhibit is turned off. In S10,--.
    Line 67, "host" should read --host 7--.

UNITED STATES PATENT AND TRADEMARK OFFICE
CERTIFICATE OF CORRECTION

PATENT NO. : 5,159,692
DATED : October 27, 1992
INVENTOR(S) : RYOICHI IMAI ET AL.

Page 2 of 2

It is certified that error appears in the above-indentified patent and that said Letters Patent is hereby corrected as shown below:

COLUMN 9

Line 25, "improved Since" should read --improved. Since--.
      Line 39, "portion" should read --portions--.

COLUMN 10

Line 47, "to reading" should read --reading--.

Signed and Sealed this

Fourteenth Day of December, 1993

*Attest:*

BRUCE LEHMAN

*Attesting Officer*     *Commissioner of Patents and Trademarks*